United States Patent
Franke et al.

(10) Patent No.: US 11,085,813 B2
(45) Date of Patent: Aug. 10, 2021

(54) METHOD FOR TESTING THE NOISE OF VEHICLES WHEN DRIVING OVER A TEST TRACK

(71) Applicant: Dr. Ing. h.c. F. Porsche Aktiengesellschaft, Stuttgart (DE)

(72) Inventors: Robert Franke, Leipzig (DE); Nico Schlimpert, Rochlitz (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 412 days.

(21) Appl. No.: 16/215,703

(22) Filed: Dec. 11, 2018

(65) Prior Publication Data
US 2019/0178706 A1 Jun. 13, 2019

(30) Foreign Application Priority Data
Dec. 12, 2017 (DE) ...................... 10 2017 129 568.2

(51) Int. Cl.
*G01H 3/08* (2006.01)
*G01M 17/007* (2006.01)
*G06F 17/14* (2006.01)

(52) U.S. Cl.
CPC ............ *G01H 3/08* (2013.01); *G01M 17/007* (2013.01); *G06F 17/142* (2013.01)

(58) Field of Classification Search
CPC ....... G01H 3/08; G01M 17/007; G06F 17/142
See application file for complete search history.

(56) References Cited

U.S. PATENT DOCUMENTS

| 2008/0161989 | A1  | 7/2008  | Breed |
|---|---|---|---|
| 2014/0379205 | A1* | 12/2014 | Muetzel ................ B60W 50/04  701/32.4 |
| 2019/0084547 | A1* | 3/2019  | Nesbitt .................. B60T 8/172 |

FOREIGN PATENT DOCUMENTS

| DE | 103 22 617     | 12/2004 |
|----|----------------|---------|
| DE | 10 2014 211 985 | 1/2015  |

OTHER PUBLICATIONS

German Examination Report dated Oct. 14, 2019.
Johnsson, et al.—A new test track for automotive squeak and rattle (S&R) detection—Applied Acoustics, vol. 80, 2014, S. 79-85.
German Search Report dated Aug. 1, 2018.

* cited by examiner

*Primary Examiner* — Manuel A Rivera Vargas
(74) *Attorney, Agent, or Firm* — Gerald E. Hespos; Michael J. Porco; Matthew T. Hespos

(57) ABSTRACT

A method is provided for testing noise of vehicles when driving over a test track. This method includes carrying out noise measurements in a vehicle driving over the test track by means of sensors arranged inside the vehicle, determining the positions of the vehicle driving on the test track and assigning the respective measurement to the position of the vehicle on the test track, evaluating the measurement results of the noise measurements, based on the respective test track position, during a comparison with known noise characteristics of comparison vehicles. The method enables an efficient objective noise test of vehicles when driving over a test track.

15 Claims, No Drawings

METHOD FOR TESTING THE NOISE OF VEHICLES WHEN DRIVING OVER A TEST TRACK

CROSS REFERENCE TO RELATED APPLICATION

This application claims priority under 35 USC 119 to German Patent Appl. No. 10 2017 129 568.2 filed on Dec. 12, 2017, the entire disclosure of which is incorporated herein by reference.

BACKGROUND

Field of the Invention

The invention relates to a method for testing the noise of vehicles when driving over a test track. In particular, the method relates to testing the noise of vehicles immediately after the vehicles have been finished.

Description of the Related Art

It is very important for a vehicle to be optimized with respect to noise behavior immediately after the vehicle is finished so that no unintentional noises are present in the vehicles. Thus, noise tests are carried out before delivery to the customer. Noise tests include so-called S&R noises (Squeak and Rattle), engine and chassis noises, wind noises and noises of electromotive drives. Squeak and rattle tests are particularly important.

The acoustic product quality in vehicles is therefore gaining ever increasing importance when developing vehicles. The noise behavior of vehicles has continuously improved, with the result that S&R noises, engine and chassis noises and wind noises are perceived to be particularly disruptive for the vehicle occupants.

The driving states of vehicles during everyday operation can be simulated very well when driving over test tracks. In this case, the vehicles can be tested by their manufacturers realistically or under extreme conditions and loads. In the case of high-end vehicle types, each vehicle is subjected to such a test.

An object of the invention is to provide a noise test of vehicles when driving over a test track, in particular a noise test that can be automated.

SUMMARY

The method for testing the noise of vehicles when driving over a test track has the following features:
 carrying out noise measurements in a vehicle driving over the test track by means of sensors arranged inside the vehicle,
 determining the positions of the vehicle driving on the test track and assigning the respective measurement to the position of the vehicle on the test track,
 evaluating the measurement results of the noise measurements, based on the respective test track position, during a comparison with known noise characteristics of comparison vehicles.

This method enables an objective noise test since the noise emission of the vehicle, based on its vehicle interior, is related to noise emissions from comparison vehicles. The comparison vehicles preferably are optimal from points of view of noise. These comparison vehicles ideally do not have any S&R noises and have engine and chassis noises and wind noises that that do not exceed acceptable levels established by the manufacturer.

Each position of the vehicle driving on the test track has an assigned noise measurement and the determined noises are associated with the known noises of comparison vehicles, based on the noise behavior of this comparison vehicle, at the same location of the test track. Thus, the vehicles can be compared objectively, and an objective statement can be made with regard to the noise behavior of the vehicle currently being tested. The noise measurements are carried out in the vehicle interior, and therefore in the space that forms the passenger area of the vehicle.

The noise measurements can be carried out by a measuring system.

The measuring system may have airborne and/or structure-borne sound sensors. These sound sensors are particularly well suited to carrying out the noise measurements in the vehicle interior.

The sensors may be distributed in the vehicle interior and a reference to the position of the noise source is established using their noise measurements.

The position of the vehicle on the test track may be determined by the measuring system. Therefore, the measuring system captures the noises/sound in the vehicle interior as well as the vehicle position on the test track and the vehicle telemetry data during the respective measurement.

The vehicle position on the test track may be captured by light barriers and/or induction barriers and/or a global positioning system (GPS) and using the vehicle state data (telemetry/CAN bus data).

The measurement results can be evaluated in different ways. For example, the measurement results may be evaluated according to the noise to be tested by various acoustic evaluation methods, such as a fast Fourier transform (FFT) and/or psychoacoustic parameters.

Known noise characteristics of comparison vehicles may be stored in a database and the measurement results may be evaluated on the basis of these noise characteristics.

Measurement results based on the respective test track positions may be stored by the measuring system and/or may be transmitted wirelessly, to an evaluation computer or a factory network at the end of the test.

The measurement results may be evaluated automatically. Automated evaluation enables noise trends to be developed and reactions to deteriorations can be made in good time.

Selected noise characteristics, a so-called acoustic fingerprint, of each vehicle are stored and then are compared with subsequent noise measurements of this vehicle or with subsequent noise measurements of comparable vehicles. This makes it possible to understand a change in the noise behavior over the age of the vehicle or over the lifetime of a vehicle series.

An item of information relating to the subsequent work required in the vehicle is assigned to a respectively determined error pattern of the noise characteristics and, if there is a substantial correspondence to known error patterns, this subsequent working solution is output concomitantly as information.

A specific method for the automated objective noise testing of vehicles when driving over a test track is explained below.

The aim of the automated test is an objective noise assessment under defined conditions for a rate of 100. In this case, the subsequent working time is intended to be optimized with a simultaneously improved vehicle quality by means of the objective measuring method that is decoupled from environmental influences to the greatest possible extent.

Noise measurement is carried out by a suitable measuring system using airborne and/or structure-borne sound sensors. A reference to the position of the noise source can be established using the distribution of the sensors in the vehicle.

The measuring system identifies the position of the vehicle on the test track using light/induction barriers and/or GPS and/or vehicle state data and analyzes measurement results according to the test. Vehicles are tested with respect to S&R noises, engine and chassis noises and wind noises. A test with respect to wind noise/leakages also is carried out in a separate wind noise test station.

Electromotive drives, for example window lifter drives or window shade, seat and further actuating motors, can be tested in an automated manner with regard to their noise behavior in a further test station.

The measurement results are evaluated according to the noise to be tested by various acoustic evaluation methods (FFT, modulation, tonality, etc.).

Known noise characteristics and limit values that are used as a basis for the evaluation are stored in a database.

This measuring system is light and small enough to be able to be fixed at a defined position in the vehicle by an employee without any problems.

The measurement data are stored only by the measuring system and are wirelessly transmitted to an evaluation computer/factory network after the end of the test. The vehicle then is released as OK or is transferred to subsequent work with detailed information relating to the necessary subsequent work. In the case of known error patterns that are found on the basis of a noise database, the corresponding subsequent working solution can be concomitantly output as information. A remeasurement after the error has been eliminated then clearly shows whether the vehicle can be released as OK.

Automated evaluation makes it possible in this case to create noise trends and to react to relevant deteriorations in good time.

Selected noise characteristics (acoustic fingerprint) are stored by each vehicle to be able to compare them with subsequent measurements and between comparable vehicles (change over lifetime).

What is claimed is:

1. A method for testing the noise of a vehicle when driving over a test track, the method comprising:
    using sensors arranged inside a vehicle for carrying out noise measurements while the vehicle is driving over the test track;
    determining positions of the vehicle driving on the test track;
    assigning the noise measurements carried out by the sensors arranged inside the vehicle to the positions of the vehicle on the test track at which the noise measurements were made;
    comparing the noise measurements carried out by the sensors arranged inside the vehicle at the respective positions on the test track at which the measurements were made with known noise characteristics of comparison vehicles at the same respective positions on the test track; and
    evaluating the measurement results of the noise measurements based on the comparison with the known noise characteristics of the comparison vehicles.

2. The method of claim 1, wherein the noise measurements are carried out in a vehicle interior of the vehicle.

3. The method of claim 2, wherein the noise measurements are carried out by a measuring system.

4. The method of claim 3, wherein the measuring system has airborne and/or structure-borne sound sensors.

5. The method of claim 4, wherein the sensors are arranged in a distributed manner in the vehicle interior and a reference to the position of the noise source is established using their noise measurements.

6. The method of claim 3, wherein the respective vehicle position on the test track is determined by the measuring system.

7. The method of claim 1, wherein the respective vehicle position on the test track is captured by light barriers.

8. The method of claim 1, wherein the measurement results are evaluated according to the noise to be tested by a fast Fourier transform (FFT), modulation or tonality.

9. The method of claim 1, wherein the known noise characteristics of comparison vehicles are stored in a database and the measurement results are evaluated on the basis of said noise characteristics.

10. The method of claim 9, wherein the measurement results, based on the respective test track position, are stored only by the measuring system and are transmitted wirelessly to an evaluation computer or a factory network at the end of the test.

11. The method of claim 1, wherein the measurement results are evaluated automatically.

12. The method of claim 1, wherein selected noise characteristics of each vehicle are stored and are compared with subsequent noise measurements of this vehicle or with subsequent noise measurements of comparable vehicles.

13. The method of claim 1, wherein an item of information relating to the subsequent work required in the vehicle is assigned to a respectively determined error pattern of the noise characteristics and, if there is a substantial correspondence to known error patterns, this subsequent working solution is concomitantly output as information.

14. The method of claim 1, wherein the respective vehicle position on the test track is captured by induction barriers.

15. The method of claim 1, wherein the respective vehicle position on the test track is captured by a global positioning system (GPS).

* * * * *